J. ASTALL.
Pipe and Bar Cutter.
No. 196,323. Patented Oct. 23, 1877.
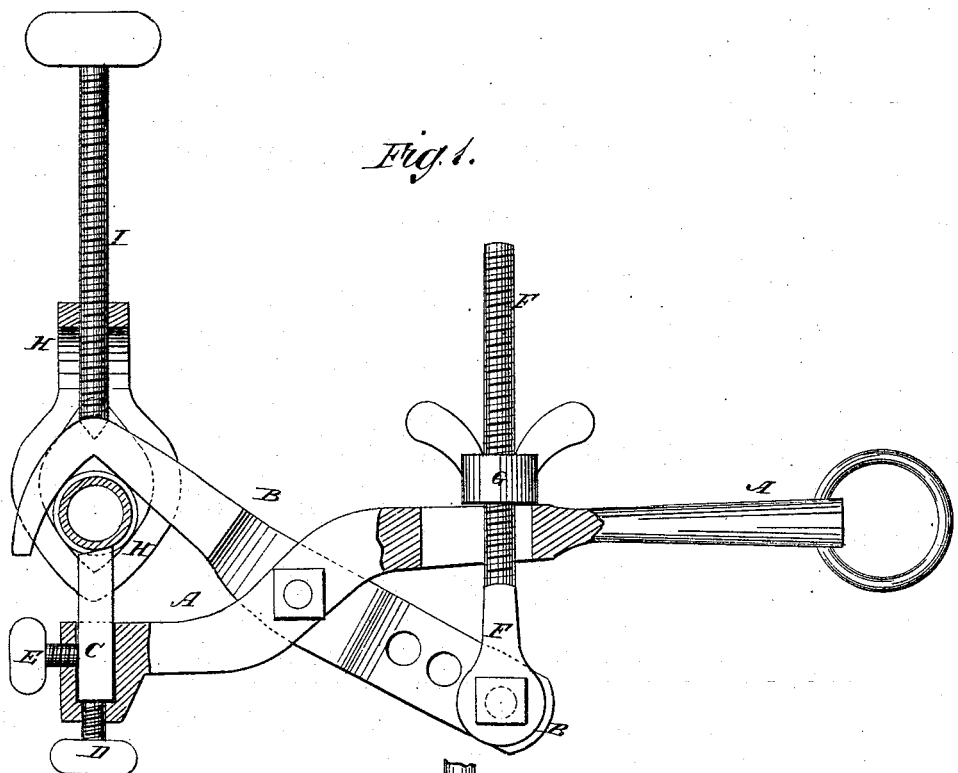
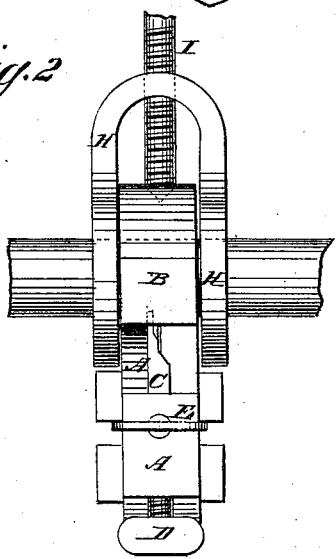
WITNESSES:
INVENTOR:
ATTORNEYS.

UNITED STATES PATENT OFFICE.

JESSE ASTALL, OF GALVESTON, TEXAS.

IMPROVEMENT IN PIPE AND BAR CUTTERS.

Specification forming part of Letters Patent No. 196,323, dated October 23, 1877; application filed May 21, 1877.

*To all whom it may concern:*

Be it known that I, JESSE ASTALL, of Galveston, in the county of Galveston and State of Texas, have invented a new and useful Improvement in Pipe and Bar Cutter, of which the following is a specification:

Figure 1 is a side view of my improved tool, partly in section to show the construction. Fig. 2 is a front view of the same.

Similar letters of reference indicate corresponding parts.

The object of this invention is to furnish an improved tool for cutting off iron pipes and bars, which shall be simple in construction, convenient in use, and effective in operation, cutting off the pipe or bar quickly and smoothly.

The invention consists in the combination of the lever provided with the cutter and the two set-screws, the lever having a hook formed upon its forward end, the feed-screw and its hand-nut, the U-bar, provided with holes in its ends to receive the pipe or bar, and the hand-screw, with each other, as hereinafter fully described.

A is the main bar or lever, in the forward end of which is formed a socket to receive the cutter C, which is adjusted by the set-screw D, passing through the bar A in line with the said cutter, and bearing against its end, and is secured in place by the set-screw E, passing in through the end of the lever A at right angles with the cutter C, and bearing against its side.

B is a lever, which is pivoted at its middle part to the lever A, near its forward end.

Upon the forward end of the lever B is formed a hook with an angular cavity, to receive the pipe to be cut, and hold it down upon the cutter C.

To the rear end of the lever B is pivoted a screw, F, which passes through a slot in the lever A, and has a hand-nut, G, screwed upon its upper end, so that by turning the said hand-nut G the cutter C may be fed forward as it cuts its way into the pipe or bar.

H is a U-shaped bar or clevis, which straddles the hook of the lever B, and has holes formed through its ends, through which the pipe or bar to be cut is passed. The holes in the ends of the U-bar H are made angular, so that it may hold different-sized pipes or bars.

In the bend of the U-bar H is formed a screw-hole, to receive the hand-screw I, the forward end of which rests against the back of the hook of the lever B, to fasten the tool securely to the pipe or bar, and prevent it from getting loose as the cutter C cuts its way into the said pipe or bar, and prevent the tool from falling when the piece has been cut off.

In using the tool, the pipe or bar to be cut is clamped in a vise, the tool is applied to it in the manner hereinbefore described, and is then turned around it, cutting it off quickly and smoothly.

Having thus described my invention, I claim as new and desire to secure by Letters Patent—

The combination of the lever A, provided with the cutter C and the set-screws D E, the lever B, having a hook formed upon its forward end, the feed-screw and its hand-nut F G, the U-bar H, provided with holes in its ends to receive the pipe or bar, and the hand-screw I, with each other, substantially as herein shown and described.

JESSE ASTALL.

Witnesses:
P. J. BUTLER,
JAMES J. ASTALL.